US008626846B2

(12) United States Patent
Coppens et al.

(10) Patent No.: US 8,626,846 B2
(45) Date of Patent: Jan. 7, 2014

(54) METHOD FOR REMOTE CONFIGURATION OF AN APPARATUS VIA A NETWORK

(75) Inventors: Jan Coppens, Merelbeke (BE);
Christoph Stevens, Stekene (BE);
Pascal Justen, Sint-Pieters-Woluwe (BE); Sven Van Den Bosch, Lochristi (BE); Willem Acke, Bonheiden (BE)

(73) Assignee: Alcatel Lucent, Paris (FR)

( * ) Notice: Subject to any disclaimer, the term of this patent is extended or adjusted under 35 U.S.C. 154(b) by 473 days.

(21) Appl. No.: 12/735,377

(22) PCT Filed: Feb. 10, 2009

(86) PCT No.: PCT/EP2009/051499
§ 371 (c)(1),
(2), (4) Date: Sep. 7, 2010

(87) PCT Pub. No.: WO2009/101077
PCT Pub. Date: Aug. 20, 2009

(65) Prior Publication Data
US 2011/0016183 A1 Jan. 20, 2011

(30) Foreign Application Priority Data
Feb. 11, 2008 (EP) .................................... 08290126

(51) Int. Cl.
*G06F 15/16* (2006.01)
(52) U.S. Cl.
USPC .......................................... 709/206; 709/207
(58) Field of Classification Search
USPC ................................................ 709/206, 207
See application file for complete search history.

(56) References Cited

U.S. PATENT DOCUMENTS

| 7,865,581 | B2* | 1/2011 | Straub et al. | 709/221 |
| 8,000,345 | B2* | 8/2011 | Blackford et al. | 370/466 |
| 2006/0028981 | A1 | 2/2006 | Wright | |
| 2007/0201508 | A1* | 8/2007 | Blackford et al. | 370/466 |
| 2009/0064268 | A1* | 3/2009 | Straub et al. | 725/152 |
| 2009/0100489 | A1* | 4/2009 | Strothmann | 725/114 |

FOREIGN PATENT DOCUMENTS

WO  WO 2007/146048  12/2007
WO  WO 2008/039481  4/2008

OTHER PUBLICATIONS

"CPE WAN Management Protocol" May 2004, Produced by DSLHome-Technical Working Group, Editors: Jeff Berstein, Tim Spets.
"ACES: An Efficient Admission Controll Scheme for QoS-Aware Web Servers" Xiangping Chen, Huamin Chen, Prasant Mohapatra, Computer Communications, 2002.
Written Opinion, Apr. 22, 2009.
International Search Report, Apr. 5, 2009.
Search Report Transmittal, Apr. 5, 2009.

* cited by examiner

*Primary Examiner* — Mohamed Wasel
(74) *Attorney, Agent, or Firm* — Harness, Dickey & Pierce

(57) ABSTRACT

An embodiment of the method includes remote configuration of at least one apparatus using a configuration server to configure the apparatus in situ via a network, to which the apparatus and the configuration server are connected. The method includes exchanging information requests and inform messages between the configuration server and the apparatus. The method further includes prioritizing, at the configuration server, the requested information indicated by the at least one of information requests and inform messages. The method also includes sending, from the configuration server, the requested information indicated by the at least one of information requests and inform messages over the network to the apparatus.

9 Claims, 4 Drawing Sheets

METHOD FOR REMOTE CONFIGURATION OF AN APPARATUS VIA A NETWORK

BACKGROUND

The present invention relates to a method for remote configuration of at least one apparatus using a configuration server to configure the apparatus in situ via a network.

Lately, it has become more common to allow apparatuses, like domestic devices, such as TV's, set-top boxes, Voice Over-Internet Phones (VoIP), laptops, media servers, modems, routers, gateways, and the like, to be configured via a network to which these apparatuses are connected, such as for instance the Internet, while at their location of use (i.e. in situ). There are several embodiments of such methods, such as for instance the SNMP and/or TR-069.

Below, by way of non-limiting example reference will be made to the TR-069 protocol, without excluding any alternative embodiment, protocol or standard, either already existing or to be developed in the future.

TR-069 is an abbreviation for Technical Report 069, and is a DSL Forum technical specification entitled CPE WAN Management Protocol (CWMP). The abbreviation CPE stands for Consumer Premise Equipment, herein also referred to as simply an "apparatus" in a broader sense than just the TR-069 protocol. The TR-069 protocol defines an application layer protocol for remote management of end-user devices or CPE's or simply apparatuses.

As a bidirectional SOAP/HTTP based protocol TR-069 provides the communication between CPE and Auto Configuration Servers (ACS), herein also referred to as configuration servers in general. It includes both a safe auto configuration and the control of other CPE management functions within an integrated framework. In the course of the boom of the broadband market, the number of different Internet access possibilities grew in proportion with this boom, where for instance modems, routers, gateways, Set-top box, and VoIP-phones became more common and the underlying technologies emerged to reach a bigger part of the public at large.

At the same time the configuration of this equipment became more complicated—too complicated for the end-users. For this reason the TR-069 protocol was developed. It provides the possibility of auto configuration of these access types. The technical specifications are managed and published by the DSL Forum. Using TR-069 the terminals can get in contact with the Auto Configuration Servers (ACS) and establish the configuration automatically. Accordingly other service functions can be provided. TR-069 is the current protocol for activation of terminals in the range of DSL broadband market. Other fora, such as Home Gateway Initiative (HGI) and DVB, are endorsing CWMP as the protocol for remote management of home network devices (e.g. the HGI gateway) and terminals (e.g. the DVB IPTV STB).

Generally speaking, such apparatus configuring methods like the TR-069 protocol have in common that the configuration information can comprise a download of information, such as programs, firmware or software, to initially set-up an apparatus for the apparatus to function as desired/intended, or to provide an update. Alternatively or additionally, the information can replace existing information in an already functioning apparatus, or an amendment or update may be desired in already provided information. The download of information to the apparatus can be initiated by the configuration server or indeed by the apparatus itself, when that is in need of initial information or of updated information, etc. For this the apparatus upon initialization or in use can send to the configuration server a request to be provided with initial or updates/amended configuration information. The apparatus may be programmed to inquire if updates are available at regular intervals. Also the configuration server may be used to download to any number of such apparatuses an updated or amended version of configuration information, when or shortly after such updated or amended configuration for the apparatuses has been made available to the configuration server. All kinds of permutations are possible, e.g. where a configuration server sends to all apparatuses a notification that a "new" version of configuration information is available for download to the apparatuses upon request, after which the apparatuses activate a routine for requesting for the "new" configuration information, and other permutations are also possible.

The problems with these prior art methods or protocols relate to the configuration servers having to provide services to growing numbers of apparatuses or end user devices or, in terms of the TR-069 protocol, CPE's.

For example, the TR-069 protocol allows defining a notification attribute for each parameter in the object model of a managed device. The notification attribute indicates whether the CPE should include changed values of the specified parameter(s) in the Inform message, and whether the CPE must initiate a session to the ACS when the specified parameter(s) change in value. Notification settings for a parameter include 'off', 'passive' and 'active'.

In case of passive notification, whenever the specified parameter value changes, the CPE must include the new value in the ParameterList in the Inform message that is sent the next time a session is established to the ACS. It is emphasized here that in case of active notification, whenever the specified parameter value changes, the CPE must initiate a session to the ACS, and include the new value in the ParameterList in the associated Inform message.

However, when many of such notifications occur (e.g., when used for sending frequent alarms to the ACS), it can significantly change the performance and scalability requirements on the ACS. However, the TR-069 protocol and other similar initiatives were designed as protocols for infrequent communication (e.g., the default periodic Inform interval in TR-069 is set to 24 hours) between an ACS and large numbers of CPE's. With new sessions being set up for very frequent active notifications, the interaction frequency may be expected to increase significantly, thus invalidating to some extent the assumptions TR-069 is based on.

Thus, the frequency of these active notifications increases (when used for alarm handling for example), there are currently no solutions to this emerging problem available.

For instance, the publication DSLHOME-TECHNICAL WORKING GROUP: "CPE-WAN Management Protocol", XP002316355, retrievable from http://www.dslforum.org/aboutdsl/Technical_Reports/TR-069.pdf in the version of Feb. 4, 2005, reflects the state of the art with respect to the TR-069 protocol, based on rare occurrences of communications and information requests or inform messages in particular.

SUMMARY

The present invention has for an objective to resolve or at least lessen the problems of the prior art by providing a method in accordance with the appended independent claim. All embodiments are based on a priority that is assigned to the TR-069 notification attributes.

The invention thus provides mechanisms that allow reducing the load on the ACS, spreading it or help it define which messages to process and which messages to refuse in accordance with a priority scheme or mechanism.

It is acknowledged here that from Chen, X., et al: "ACES: An efficient admission control scheme for QoS-aware web servers" a prioritization of server information is known, However, this know prioritization scheme relates specifically to high-load web-servers with anticipated high frequencies of information requests and inform messages. The skilled person would find no incentive in this disclosure to apply the teachings thereof in the TR-069 or any similar low-load oriented protocol or technology, as for instance known from DSLHOME-TECHNICAL WORKING GROUP: "CPE-WAN Management Protocol", XP002316355.

The invention can be embodied in different manners, each forming a preferred embodiment of the invention. Such embodiments are defined in the appended dependent claims.

For example, an embodiment can be to prioritize inform messages according to the TR-069 protocol at the ACS side to allow the ACS to refuse or delay low-priority sessions. Low priority sessions could even be advanced, if the capacity demand of the ACS allows for this, and dependent on other inform messages and the priority thereof attributed thereto. If pursuant to the TR-069 protocol a CPE is addressed on a designated or predetermined port and URL, this causes the CPE to perform a fixed action: it establishes a session with the pre-determined ACS address. Once a connection is established, the CPE sends an inform message to the ACS. With the priority attributed to the inform message, sequences for handling of inform messages can be done in accordance with the predetermined order or prioritization.

Alternatively, such prioritization could be embodied at the CPE side to allow the CPE to block, pause or delay low-priority sessions.

In the embodiment of setting the manner of handling of inform messages at the ACS side, it is possible to prioritize all inform messages so there is control over which inform messages are dropped at the ACS side in overload conditions. At least in this embodiment the ACS will have available all current needs for information and is best able to assign a handling order or sequence or could even be allowed to disregard information requests or messages. This priority information can be included in the inform messages or in a header field in any lower layer network protocol (e.g., HTTP, TCP, etc.). Also the ACS could have available a table in which the inform messages are ranked by priority.

In the embodiment where the prioritization is done at the CPE side, a threshold can be defined on the CPE for each parameter with active notification. If the notification priority of the parameter is below the threshold, no active notification, new event code or alternative delivery is sent. The threshold can be set on the basis of alarm severity and/or on categorizing what is an alarm for that CPE.

Also, in general for prioritizing at the configuration server or in the apparatus, it is possible to define a threshold vector, where the index corresponds to the priority-number, and the value the number of pending alarms for this priority. For example, in the TR-069 protocol, prio[1..3]={1, 5, 10} is an indication that if one prio=1 alarm is pending, an inform message is to be sent, and if 5 prio=2 alarms have been cumulated, another inform message is to be sent.

The case described in this embodiment maps to the following: prio[1..x]={1, 1, 1, 0, 0, 0, ... 0}, where a "0" indicates that no inform message is to be sent, and where the threshold here is prio=3. The same can naturally be embodied in the configuration server.

Additionally or alternatively a back-off mechanism, which could be dynamic, can be employed within the scope of the present invention. Such a back-off mechanism can be provided in the ACS (based on the configured threshold) or in the CPE. In overload conditions, sessions may be refused or declined, which defines a back-off mechanism. By sending a notification to the CPE or CPE's that an overload situation is occurring, this causes the CPE or CPE's to "back off" and send the inform message at a later time instance. If the active notifications are high-priority, the back-off interval might be shorter, or the inform message may be awarded priority in a priority listing of sending tasks.

Additionally or alternatively the invention could comprise sending an "umbrella" alarm. When too many alarms are generated by the CPE, an "umbrella" alarm, i.e. an alarm indicating "too many alarms", can be sent to the ACS instead of each individual alarm. This way, only a single session is set up with the ACS and the burden of investigating each alarm is put on the ACS. However, the required buffer of alarms is maintained on the CPE. Alternatively, both an "umbrella" alarms and individual alarms may be sent, but with different priority.

Further, additionally or alternatively a dedicated ACS could be employed for high-priority notifications. More in general a separate ACS could be provided for each priority or class or group of priorities, comprising a predetermined number of priorities. In addition to the regular ACS, it is possible to install a dedicated ACS, which has the task of handling high-priority active notifications. The regular ACS will need to configure each CPE with the address of the other ACS, which will also require changes to the TR-069 protocol, if that is the embodiment of the present invention actually employed for incorporating the invention therein. In this variant of the invention, the inform message or information request being sent can be analyzed via a TR-069 proxy and routed accordingly towards a dedicated ACS. It is noted this may involve inspection of ParameterValues and/or a new EventCode in the inform message or information request.

Because the existing solutions do not address the problem of many active notifications, the main advantages of the present invention are scalability and overload protection of the configuration server, and in case of the TR-069 protocol this configuration server is an ACS.

BRIEF DESCRIPTION OF THE DRAWINGS

The present invention will now be elucidated by way of example in the following description, which is drawn up in conjunction with the accompanying drawings, wherein the same or similar components, features and aspects of the invention are identified with the same reference numbers, and wherein.

DETAILED DESCRIPTION OF EXAMPLE EMBODIMENTS

Figure 1:
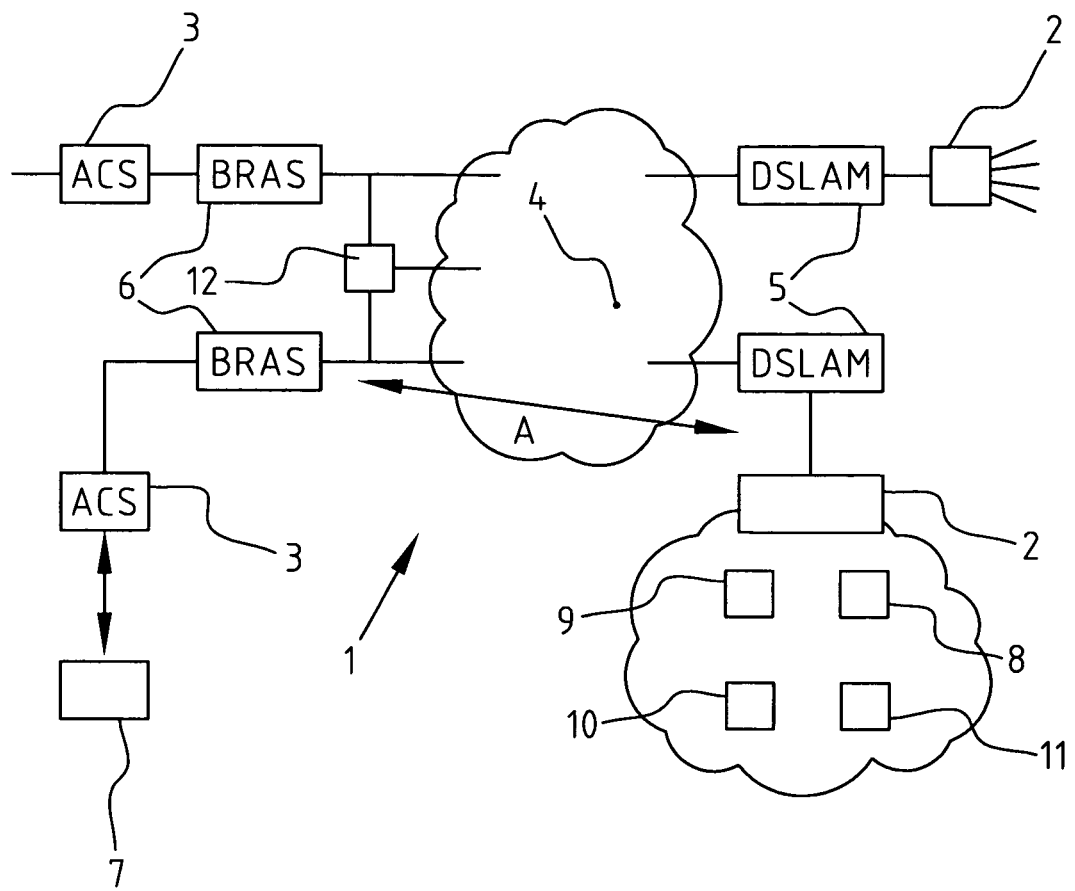
FIG. 1 shows a TR-069 protocol based system in which the invention is embodied.

In FIG. 1 a TR-069 protocol based system 1 is shown schematically. The system forms an embodiment of the present invention, comprising a network 4 to which at least one CPE 2 as well as at least one ACS 3 are connected. Each CPE 2 is connected to the network 4 via a DSLAM 5, whilst each ACS 3 is connected to the network 4 via a BRAS 6. Each ACS 3 can be under control of a corresponding OSS or service configuration manager 7. Likewise, each CPE 2 is connected to at least one end-user device, such as a set-top box 8, a VoIP telephone 9, a router 10, a gateway 11, etcetera. The CPE 2 can be a part of and incorporated into any of the devices 8-11, or even into the DSLAM 5.

The shown configuration according to the TR-069 protocol allows defining a notification attribute for each parameter in the object model of a managed device 8-11 or CPE 2 itself, or even the DSLAM 5. In FIG. 1, two single CPE's 2 and two distinct ACS's 3 are shown. More CPE's 2 and ACS's 3 are also possible, which be described in more detail below.

The notification attribute indicates whether the CPE 2 should include changed values of the specified parameter(s) in any inform message sent by the CPE to an ACS 3, and whether the CPE 2 must initiate a session to the ACS 3, when the specified parameter(s) change in value. Notification settings for a parameter include 'off', 'passive' and 'active'.

In case of passive notification, whenever the specified parameter value changes, the CPE 2 must include the new value in the ParameterList in the Inform message that is sent the next time a session is established to the ACS 3. In case of active notification, whenever the specified parameter value changes, the CPE must initiate a session to the ACS, and include the new value in the ParameterList in the associated Inform message.

However, when many of such notifications occur (e.g., when used for sending frequent alarms to the ACS 3), it can significantly change the performance and scalability requirements on the ACS 3. Namely, when the frequency of these active notifications increases (when used for alarm handling for example), the invention is intended to provide a solution.

According to the invention mechanisms are defined to allow reducing the load on the ACS 3 or ACS's 3, spreading it or help it define which messages to process and which messages to refuse to a priority mechanism.

The invention comprises several measures and/or features that are embodied in isolation or any combination, to reduce the load on the ACS 3 or ACS's 3 in case of very frequent active notifications. All embodiments are based on a priority that is assigned to the TR-069 notification attributes.

The first preferred embodiment relates to prioritizing TR-069 inform messages. This can be done either or both of at the ACS 3 side to allow the ACS 3 to refuse, delay or advance low-priority sessions. Additionally or alternatively prioritization can be done at the CPE 2 side to allow the CPE 2 itself to block low-priority sessions. In the first embodiment, it is possible to prioritize all inform messages sent along connection A over the network 4, so there is control over which inform messages are dropped, delayed or advanced in a handling queue at the ACS 3 side in overload conditions.

This priority information can be included in the inform messages or in a header field in any lower layer network protocol (e.g., HTTP, TCP, etc.).

In another alternative or additional embodiment, a threshold can be defined on the CPE 2 for each parameter with active notification. If the notification priority of the parameter is below the threshold, no active notification, new event code or alternative delivery is sent. The threshold can be on alarm severity and/or on categorizing what is an alarm for that CPE 2, from which the inform message or information request originates. Another possibility (i.e., the general case) is to define a threshold vector, where the index corresponds to the priority-number, and the value the number of pending alarms for this priority. For example, prio[1. .3]={1, 5, 10} means if one prio=1 alarm is pending, send an inform message, if 5 prio=2 alarms have been cumulated, send an inform message. The original case described in the embodiment maps to the following: prio[1. .x]={1, 1, 1, 0, 0, 0, . . . , 0} [0 means no inform to be sent] where the threshold here is prio=3.

Further, additionally or alternatively a dynamic back-off mechanism can be implemented. It is possible to implement such a measure of a back-off mechanism in the ACS 3 (based on the configured threshold) or in the CPE 2. In overload conditions, sessions may be refused, which causes the CPE 2 to "back off" and send the inform message or information request at a later time instance. If the active notifications are high-priority, the back-off interval might be shorter. The inform request can take precedence over back-off signals emitted by the ACS 3.

Also, additionally or alternatively an "umbrella" alarm could be sent. When too many alarms are generated by the CPE 2, an "umbrella" alarm (i.e., a "too many alarms"-alarm) is sent to the ACS 2 instead of each individual alarm. This way, only a single session is set up with the ACS 3 and the burden of investigating each alarm is put on the ACS 3. However, the required buffer of alarms is maintained on the CPE 2.

Alternatively, both an "umbrella" alarms and individual alarms may be sent, but with different priority.

Also, additionally or alternatively, a dedicated ACS 3 for higher-priority notifications can be provided. In addition to the regular ACS 3, it is possible to install a dedicated ACS 3, which has the task of handling high-priority active notifications. The regular ACS 3 will need to configure each CPE 2 with the address of the other higher priority ACS 3, which will also require changes to the TR-069 protocol.

In this embodiment with the aid of a TR-069 proxy 12, the inform message sent along connection A can be routed accordingly towards a dedicated ACS 3 designed for handling inform messages or information requests from CPE's 2 at a predetermined priority level. This may involve inspection of ParameterValues and/or a new EventCode in the inform message sent over connection A to the plurality of ACS's 3 via the proxy 12. Other inform messages or information requests may be directed to another of the ACS's 3, since these have another (higher or lower) priority, indicated these should be handled by and routed to the correspondingly selected ACS.

The decision what priority to assign to any parameter can be taken by an operator (a person or component) in control of the ACS and the CPE's, i.e. the operator decides which parameters are relevant to get notified and in which manner (passive or active notification).

The present invention as such thus relates to an extra dimension in this respect: not only the operator must know or record somewhere what parameters must be notified for value changes and how this is to be achieved. It is also relevant or at least of interest how frequently the operator is interested to receive notification for a given parameter.

This issue of parameter notification classification (in terms of importance or priorities) becomes primordial, when the received number of parameter value change notifications reaches a critical amount, in such a way the ACS gets overloaded and is not able to function properly (i.e. when notifications become too frequent and/or the number of CPE's to manage exceeds a certain critical point).

The manner in which prioritized parameter value change notifications are handled, is as follows:

Basically, such prioritized parameter value change notifications can be handled either at CPE side or at ACS side. In particular an association between the parameter name and its notification priority [A1] plus an association between notification priority and its notification attempts count [A2] must be registered, memorized, stored or otherwise kept "somewhere":

In a first case of association at the CPE side, most obviously [A1] is anextra Parameter Attribute information in the TR-069 Object Model database, and a global priority vector [A2]. In this first case the CPE decides when notifications are sent, and the ACS accept them unconditionally. This is in fact a conventional arrangement.

In a second case of association at the ACS side, most obviously [A1] is provided as a table comprising parameter value change notifications applicable to all or a group of CPE's. Groups of CPE's can for instance be defined based on IP address or from information retrieved from the Inform message, e.g. TR-069 DeviceId, DeviceType or one or more of its constituents (ProductClass, OUI, Manufacturer). For each CPE, a dedicated priority vector [A2] is kept. In this case the CPE sends notifications in a per se conventional manner, and the ACS decides when notifications are being accepted to further handling.

Then in a third case of mixed CPE/ACS, the CPE maintains and manages [A1]. Upon notification, the CPE sends an Inform extended with an indicator field containing the highest priority notification of the list. In this case, the CPE classifies and reports the highest impacted priority to the ACS and the ACS decides if it accepts the notification for further handling.

For both the second and third cases, the ACS owns a dedicated [A2] per CPE and compares this priority indicator from the Inform message with this [A2] for this CPE, and by consequence can decide to accept or reject the session.

In semantics terms, the preceding description can be summarized as follows:

TABLE A1 name = "InternetGatewayDevice.Parameter1", priority = 3
name = "InternetGatewayDevice.Parameter2", priority = 2
...

TABLE A2 prio = 1, threshold = 2, attempts = 0
prio = 2, threshold = 3, attempts = 2
prio = 3, threshold = 7, attempts = 6
...

Parameter Notification (algorithm):

-Validate notification attempt:
  * Lookup Priority p by Parameter Name in table [A1]
  * Increment value of attempts for priority p in table [A2]
  * Threshold is reached? (i.e. attempts[p] reaches threshold[p]). If yes, the notification attempt is validated and reset attempts for priority p in table [A2]
  * Threshold not reached? (i.e. attempts[p] under threshold[p]) .Reject.
- If the notification is validated, proceed with parameter notification scenario
- If the notification is rejected, abort the scenario Next, the manner for the ACS to manage [A1] on the CPE is described for the first and third cases.

A first option is through extension of Parameter Notification Attributes in the TR-069 Object Model.

For this, the ACS is aware what priority must be assigned to which parameters. In order to receive (active or passive) parameter value change notifications, the ACS must modify the "parameter notification type" attribute of every parameter in question (ACTIVE notification). For this purpose, the standard TR-069 SetParameterAttributes RPC is used.

This RPC contains an array of 1 or more SetParameterAttributesStruct. Each constituent and individual SetParameterAttributesStruct contains the parameter attributes for 1 parameter in question. In a specific current embodiment this is composed as follows:

Name: the complete Parameter Name
Notification: the Parameter Notification Type, being 0 (OFF), 1 (PASSIVE) and 2 (ACTIVE)
AccessList: an array of zero or more entities for which write access to the specified Parameter(s) is granted, which is in itself not particularly relevant.

This SetParameterAttributesStruct can now be extended with priority information:

NotificationPriority: is a numeric value that assigns a priority to subsequent parameter value changes of the parameter in question. This is particularly relevant for the aspect of the present invention of prioritized types of information requests or messages.

Alternatively it is within the realm of possibilities for the skilled person to define a new TR-069 RPC in order to set priorities on parameters.

Next it is described below how the ACS manages [A2] on the CPE for the first case. This can be achieved in three ways:
1. By defining a new TR-069 RPC in order to assign priorities and thresholds.
2. By defining a dedicated Object Model tree, comprising an array of objects reflecting associations [A2]
3. Predefined and/or standardized priority classes (e.g. priority 1=URGENT, 2=NORMAL, etc.) possibly and preferably combined with predefined thresholds. In this case, no ACS participation is needed.

The manner in which the ACS manages [A1] and [A2] on the ACS for cases 2 and 3 is self-explanatory, since the ACS manages [A1] and [A2] "locally" in its database.

Figure 2:
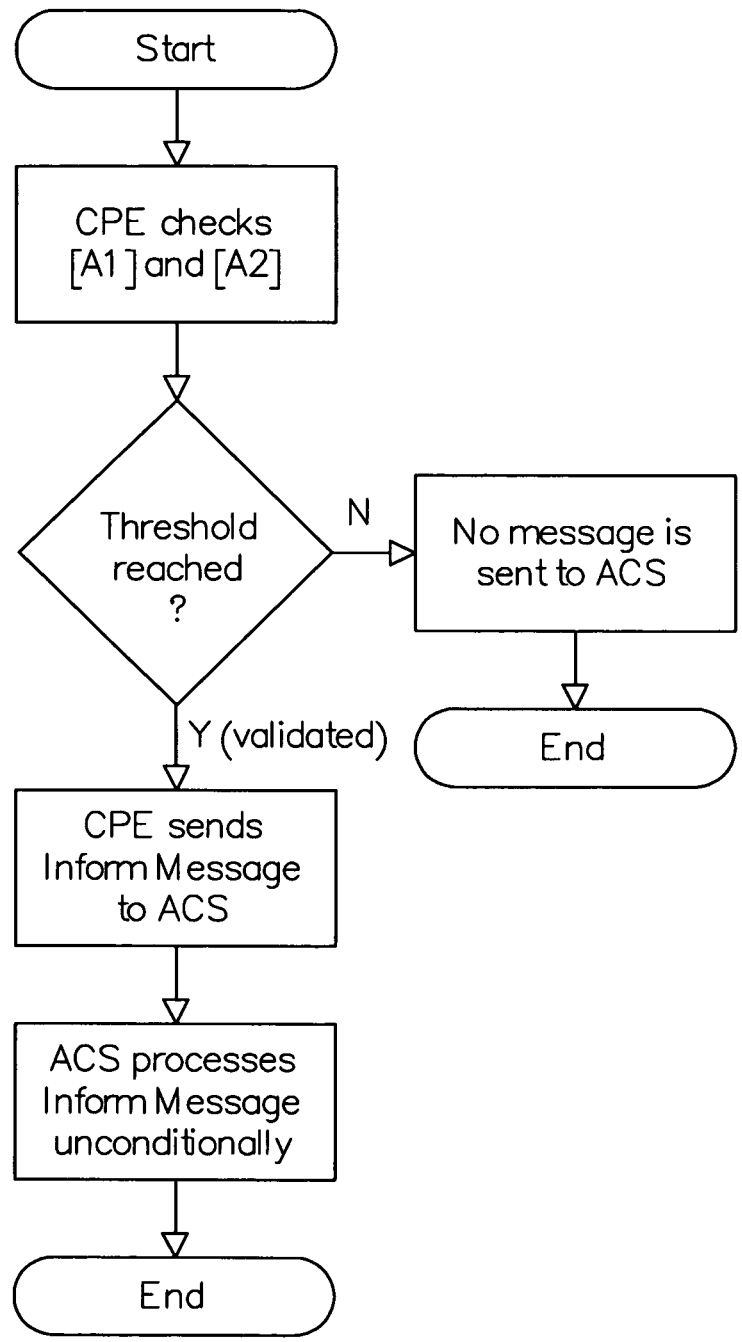
In FIG. 2 a flow chart is depicted for clarifying the process order in the scenario of case 1.

In FIG. 2 a flow chart is depicted for clarifying the process order in the scenario of case 1. According to FIG. 2, CPE validates whether an Inform must be sent, based on [A1] and [A2]. If this is found to be the case, and if this is validated, an Inform message is sent. Thereafter, the ACS processes the notifications unconditionally.

Figure 3:
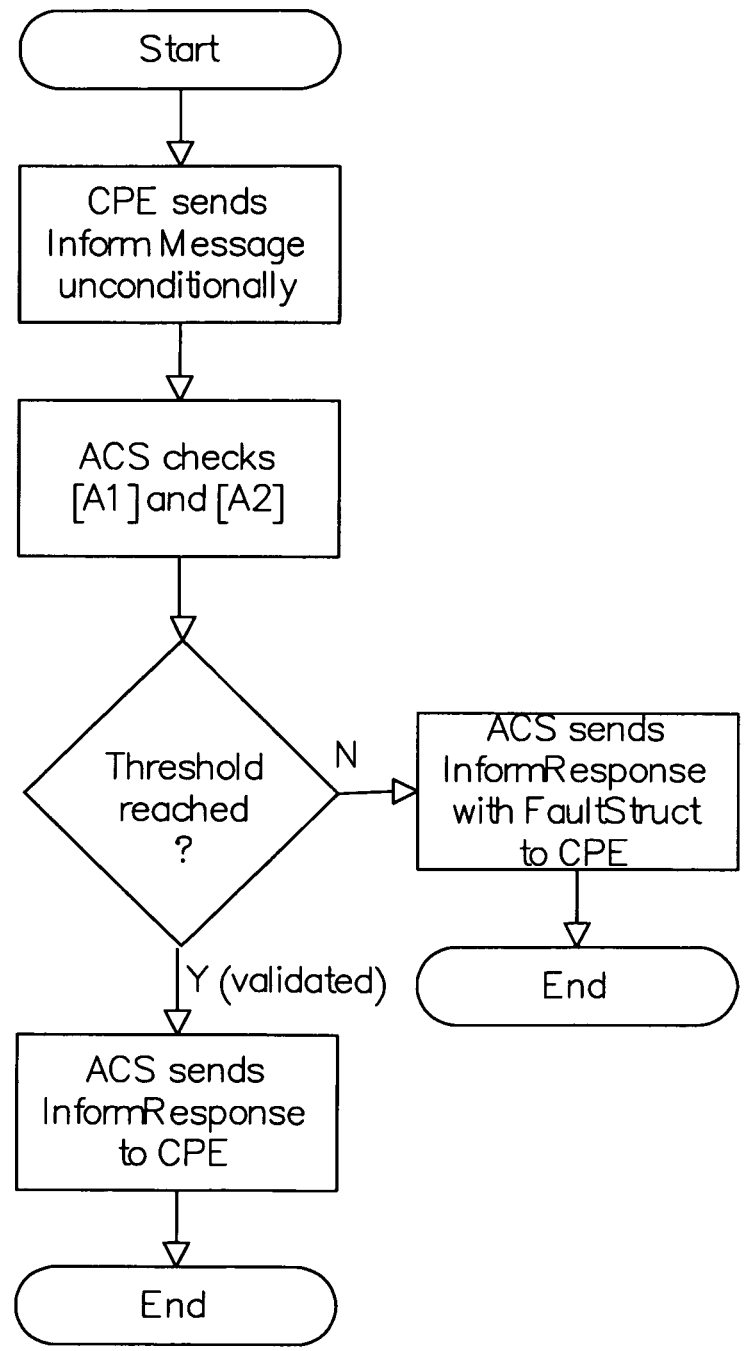
In FIG. 3 a flow chart is depicted for clarifying the process order in the scenario of case 2.

In FIG. 3 a flow chart is depicted for clarifying the process order in the scenario of case 2. Therein, the CPE sends an Inform message unconditionally. In response, the ACS checks [A1] and [A2] to see if the threshold was reached, and either validates or rejects. In case of validation, the InformResponse is sent. If rejected, InformResponse is sent with FaultStruct. This can indicate a fault code, for instance: 8001 can be an indication for "Request Denied", 8004 can be an indication for "Resources Exceeded" and/or 8005 can be an indication for "Retry Request".

Figure 4:
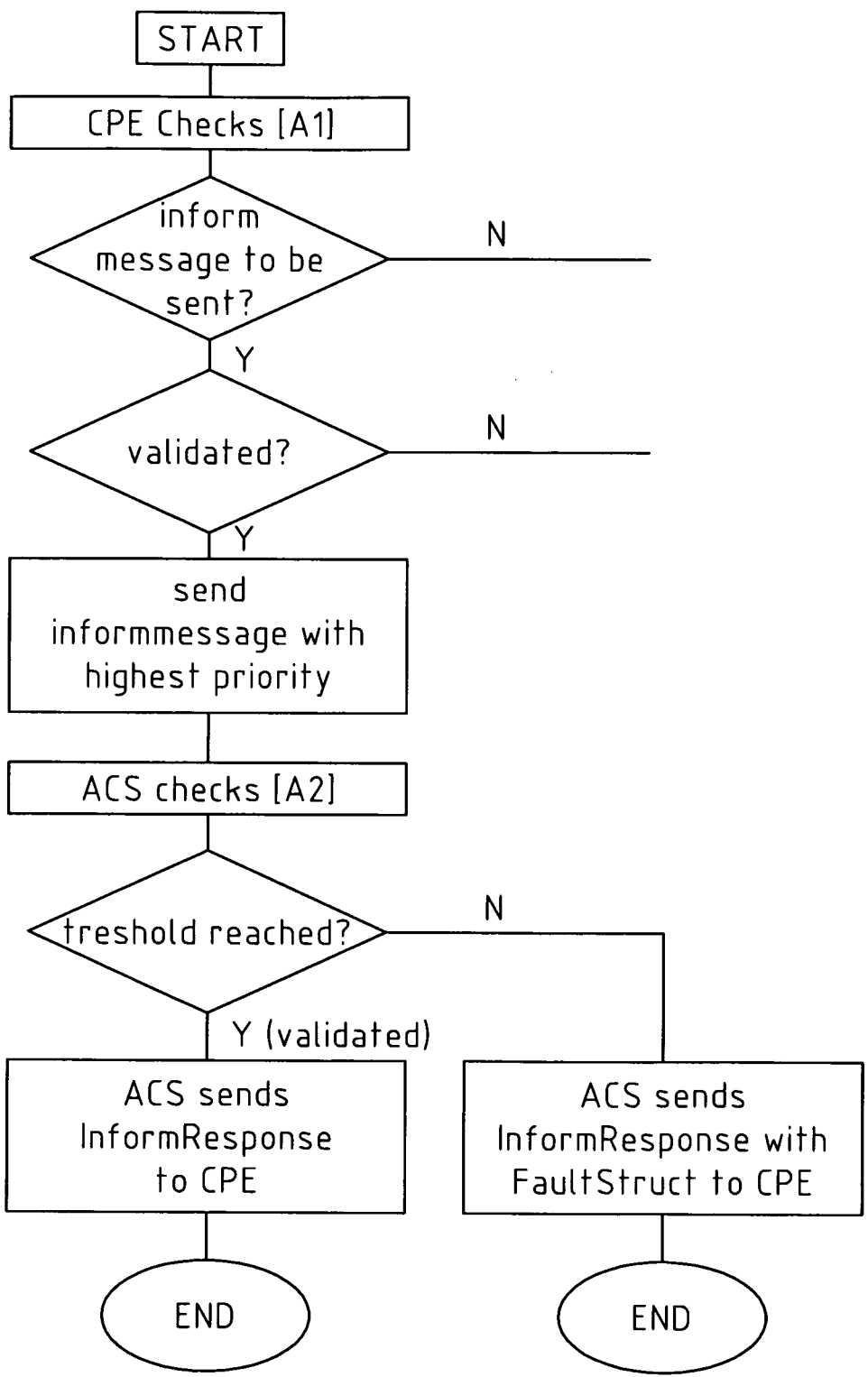
In FIG. 4 a flow chart is depicted for clarifying the process order in the scenario of case 3.

Then also for the scenario of case 3 in FIG. 4 a flow chart is depicted for clarifying the relevant process order. Therein, the CPE evaluates whether an Inform must be sent, based on [A1]. If validated, the Inform message containing highest priority is sent. Then, the ACS checks [A2] to see if the threshold was reached, and either validates or rejects. In case of validation, the InformResponse is sent, while in case of rejection, the InformResponse is sent with a FaultStruct, which can again be a fault code such as: 8001, 8004 and/or 8005 (Retry Request)

After the preceding description of an exemplary embodiment of the invention in conjunction with specific alternative or additional embodiments and shown in the accompanying drawings, the skilled person will immediately realize, that many alternatives and supplemental possibilities are within the scope of the invention as defined in the appended claims, unless these variations depart from the letter or spirit of the claims. For instance, the invention may relate to another protocol than TR-069, such as the SNMP protocol. Further, the invention may relate to end-user devices with CPE's incorporated therein. Also any single CPE 2 could be employed to service any number of end-user devices, as noted above. More than two ACS's 3 could be provided to divide the workload there over. Especially when a division is made on the basis of priorities for inform messages, more ACS's may be useful to handle the subsequent provision in information to the CPE's 2. Further it is noted that the TR-069 proxy 12 is shown in the figure as arranged between the B-RAS 6 and the DSLAM 5, although the skilled person may recognize, that a more suitable position of the proxy 12 could be located between the ACS's 3 and the B-RAS 6, in view of the relevant PPP-termination.

The invention claimed is:

1. A method for remote configuration of at least one apparatus using a configuration server to configure the at least one apparatus in situ via a network, to which the at least one apparatus and the configuration server are connected, the method comprising:
   exchanging at least one of information requests and inform messages between the configuration server and the at least one apparatus;
   prioritizing, at the configuration server, the requested information indicated by the at least one of information requests and inform messages;
   sending, from the configuration server, the requested information indicated by the at least one of information requests and inform messages over the network to the at least one apparatus; and
   emitting, from the configuration server, a delay request to the at least one apparatus, the delay request providing an indication to the at least one apparatus regarding a time delay before the at least one apparatus is to resubmit the at least one of information requests and information messages to the configuration server.

2. The method according to claim 1, further comprising:
   creating a table with a ranking of prioritized types of information requests or messages, and
   referring to said table upon arrival at the configuration server for determining a handling order.

3. The method as claimed in claim 1, further comprising:
   defining a threshold vector for the prioritizing at the configuration server or in the at least one apparatus.

4. The method as claimed in claim 1, further comprising:
   determining the time delay to be obeyed in dependence of the priority of the at least one of information requests and inform messages.

5. The method as claimed in claim 1, further comprising:
   sending from the at least one apparatus a combined or "umbrella" alarm indicating multiple inform messages or information requests.

6. The method as claimed in claim 1, further comprising:
   providing at least two configuration servers, and dividing handling of the at least one of information requests and inform messages over the configuration servers.

7. The method as claimed in claim 6, further comprising:
   analysing the at least one of information requests and inform messages with the aid of a TR-069 proxy and routing the at least one of information requests and inform messages to a corresponding one of the configuration servers on the basis of priority attributed to the at least one of information requests and inform messages in question at any given time.

8. The method as claimed in claim 6, further comprising:
   associating with the at least one of information requests and inform messages a selected ACS on the basis of either or both of a priority to be attributed to the at least one of information requests and inform messages and a relevant TR-069 parameter.

9. The method as claimed in claim 1, wherein the prioritizing is performed at either or both of the configuration server side and the at least one apparatus side.

* * * * *